(12) United States Patent
Meiri et al.

(10) Patent No.: US 11,620,524 B2
(45) Date of Patent: Apr. 4, 2023

(54) ISSUING ALERTS FOR STORAGE VOLUMES USING MACHINE LEARNING

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/837,125

(22) Filed: Jun. 10, 2022

(65) Prior Publication Data

US 2022/0318629 A1 Oct. 6, 2022

Related U.S. Application Data

(63) Continuation of application No. 16/264,828, filed on Feb. 1, 2019, now Pat. No. 11,449,749.

(51) Int. Cl.
*G06N 3/08* (2006.01)
*G08B 21/18* (2006.01)
*G06F 16/11* (2019.01)
*G06N 20/00* (2019.01)

(52) U.S. Cl.
CPC ............. *G06N 3/08* (2013.01); *G06F 16/128* (2019.01); *G06N 20/00* (2019.01); *G08B 21/18* (2013.01)

(58) Field of Classification Search
CPC ........ G06N 3/08; G06N 20/00; G06F 16/128; G08B 21/18
See application file for complete search history.

(56) References Cited

U.S. PATENT DOCUMENTS

| | | | |
|---|---|---|---|
| 7,647,131 B1 * | 1/2010 | Sadowski | G05B 23/0297 702/181 |
| 2014/0154986 A1 * | 6/2014 | Lee | H04B 7/26 455/41.2 |
| 2018/0336081 A1 * | 11/2018 | Tee | G06F 11/3006 |
| 2019/0334786 A1 * | 10/2019 | Dutta | H04L 43/0852 |
| 2019/0334801 A1 * | 10/2019 | Dutta | G06F 11/3447 |
| 2019/0334802 A1 * | 10/2019 | Dutta | G06F 11/3006 |
| 2020/0076812 A1 * | 3/2020 | Spurlock | H04L 63/102 |
| 2020/0133489 A1 * | 4/2020 | Martin | G06F 12/0842 |
| 2021/0026960 A1 * | 1/2021 | Martin | G06F 3/067 |
| 2021/0374021 A1 * | 12/2021 | Santhakumar | G06F 11/3485 |

* cited by examiner

*Primary Examiner* — David Bilodeau
(74) *Attorney, Agent, or Firm* — Krishnendu Gupta; Lesley Leonessa

(57) ABSTRACT

A method is used in issuing alerts for storage volumes using machine learning. A machine learning system analyzes Input/Output (I/O) data of a storage volume in a data storage system. The machine learning system is trained with sample I/O data patterns associated with the storage volume. Based on the I/O data, the machine learning system identifies atypical behavior associated with I/O data patterns of the I/O data. The method then issues an alert.

20 Claims, 4 Drawing Sheets

---

400 ANALYZE, BY A MACHINE LEARNING SYSTEM, INPUT/OUTPUT (I/O) DATA OF A STORAGE VOLUME IN A DATA STORAGE SYSTEM, WHEREIN THE MACHINE LEARNING SYSTEM IS TRAINED WITH SAMPLE I/O DATA PATTERNS ASSOCIATED WITH THE STORAGE VOLUME

401 BASED ON THE I/O DATA, IDENTIFY, BY THE MACHINE LEARNING SYSTEM, ATYPICAL BEHAVIOR ASSOCIATED WITH I/O DATA PATTERNS OF THE I/O DATA

402 ISSUE AN ALERT

| Time (hours) | Monday | Tuesday | Wednesday | Thursday | Friday | Saturday | Sunday |
|---|---|---|---|---|---|---|---|
| 00 | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average |
| 01 | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average |
| 02 | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average |
| ... | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average |
| 23 | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average | Read I/O: Total, Max, Min, Average Write I/O: Total, Max, Min, Average |

FIG. 2

ISSUING ALERTS FOR STORAGE VOLUMES USING MACHINE LEARNING

BACKGROUND

Technical Field

This application relates to issuing alerts for storage volumes using machine learning.

Description of Related Art

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

Unfortunately, there exist malicious entities that attempt to infiltrate computer systems, distributed storage systems, data storage systems and networking systems. These malicious entities launch malware to attack these systems. For example, during an attack, malware may obtain information located on these systems, damage the information located on these systems, or in the case of ransomware, hold the information on the systems hostage until a ransom is paid to "unlock" the information located on the computer system, data storage systems and networking systems. These attacks are launched both on large computer systems (such as financial institutions) as well as the computer systems of private individuals. These malware attacks may result in large financial gain for the attackers, and much damage for the target systems, and individuals involved.

SUMMARY OF THE INVENTION

In accordance with one aspect of the invention is a method used in issuing alerts for storage volumes using machine learning. A machine learning system analyzes Input/Output (I/O) data of a storage volume in a data storage system. The machine learning system is trained with sample I/O data patterns associated with the storage volume. Based on the I/O data, the machine learning system identifies atypical behavior associated with I/O data patterns of the I/O data, and an alert is issued.

In accordance with one aspect of the invention is a system used in issuing alerts for storage volumes using machine learning. A machine learning system analyzes Input/Output (I/O) data of a storage volume in a data storage system. The machine learning system is trained with sample I/O data patterns associated with the storage volume. Based on the I/O data, the machine learning system identifies atypical behavior associated with I/O data patterns of the I/O data, and an alert is issued.

In accordance with another aspect of the invention, a computer program product comprising a computer readable medium is encoded with computer executable program code. The code enables execution across one or more processors for issuing alerts for storage volumes using machine learning. A machine learning system analyzes Input/Output (I/O) data of a storage volume in a data storage system. The machine learning system is trained with sample I/O data patterns associated with the storage volume. Based on the I/O data, the machine learning system identifies atypical behavior associated with I/O data patterns of the I/O data, and an alert is issued.

BRIEF DESCRIPTION OF THE DRAWINGS

Features and advantages of the present technique will become more apparent from the following detailed description of exemplary embodiments thereof taken in conjunction with the accompanying drawings in which:

FIG. 2 is an example illustration of counters used to identify I/O data patterns, in accordance with an embodiment of the present disclosure.

DETAILED DESCRIPTION OF EMBODIMENT(S)

Figure 1:
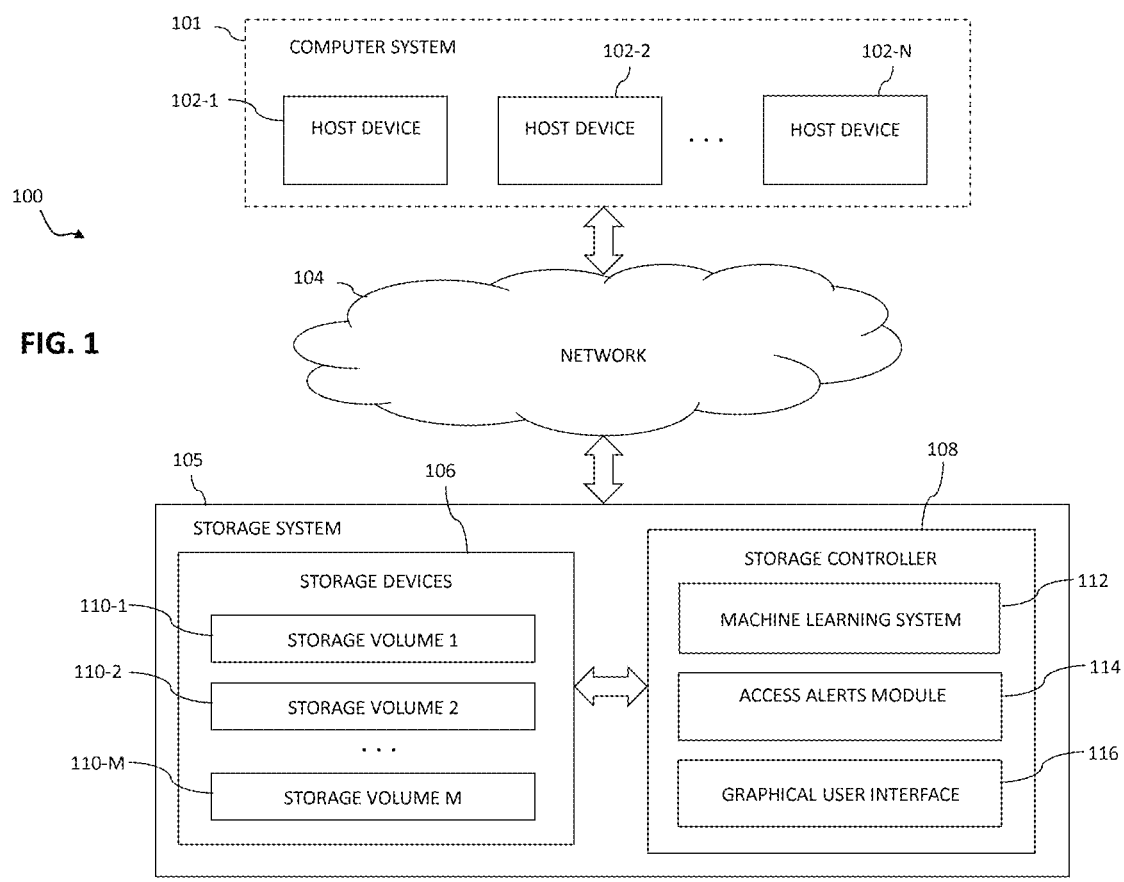
FIG. 1 is a simplified illustration of an information processing system, in accordance with an embodiment of the present disclosure.

Described below is a technique for use in issuing alerts for storage volumes using machine learning, which technique may be used to provide, among other things, analyzing, by a machine learning system, Input/Output (I/O) data of a storage volume in a data storage system, where the machine learning system is trained with sample I/O data patterns associated with the storage volume, based on the I/O data, identifying, by the machine learning system, atypical behavior associated with I/O data patterns of the I/O data, and issuing an alert.

As described herein, in at least one embodiment of the current technique, a machine learning system is trained by analyzing sample I/O data patterns over various periods of time. Once trained, the machine learning system analyzes the I/O data of a storage volume in a data storage system. Changing I/O data patterns in a storage volume may indicate an issue such as storage volume overload or a rogue program (i.e., malware) issuing illegal commands. At the extreme, changing I/O data patterns in a storage volume may indicate a security risk. When the machine learning system identifies atypical behavior associated with the I/O data patterns of the I/O data, an access alerts module issues an alert, indicating, for example, the potential security risk. The atypical behavior associated with the I/O data patterns may include as noted above for example, volume overload, or a rogue program (i.e., malware) issuing illegal commands.

Malware, in general, and especially ransomware attacks are becoming a popular way for cyber criminals to attack (also referred to herein as "penetrate") financial institutions, companies, as well as private individuals. Such attackers use new methods of penetration each time they attack using a malware and continually attempt to penetrate computing systems at all times. Further, no two attacks using malware are identical in nature, making detection of such attacks very difficult, if not impossible, to prevent. The longer a malware attack continues undetected, the greater amount of damage that can occur. Conventional technologies cannot detect new malware and protect storage systems in real time by issuing access alerts. Conventional technologies cannot detect new types of malware such as ransomware and Cryptolocker (also a type of ransomware). Conventional technologies do not use I/O data patterns to identify malware attacks on storage systems, and issue access alerts. Conventional technologies that monitor for suspicious activity, for example, peaks in I/O activity, result in many false alarms, since peaks in I/O activity may be, for example, the result of a normal backup process. Alternatively, not monitoring I/O activity may miss the opportunity to identify suspicious activity as it is happening, or suspicious activity that has already occurred.

By contrast, in at least some implementations in accordance with the current technique as described herein, a machine learning system analyzes Input/Output (I/O) data of a storage volume in a data storage system, where the machine learning system is trained with sample I/O data patterns associated with the storage volume. Based on the I/O data, the machine learning system identifies atypical behavior associated with I/O data patterns of the I/O data, and an alert is issued.

Thus, in at least one embodiment of the current technique, by analyzing Input/Output (I/O) data of a storage volume in a data storage system, identifying atypical behavior associated with I/O data patterns of the I/O data, and issuing an alert, the current method helps in detecting the malware attack as soon as the atypical behavior is identified, prior to the damage that may be caused to the distributed storage system(s) by the malware. The current method also identifies false alarm alerts, and re-trains the machine learning system to reduce and/or eliminate false alarms.

Thus, the goal of the current technique is to provide a method and a system for identifying atypical behavior efficiently and in timely manner in order to enable faster detection of malware attacks thereby reducing or eliminating potential damages that may be caused by such malware attacks. Another goal is to reduce and/or eliminate false alarm access alerts.

In at least some implementations in accordance with the current technique described herein, the use of issuing alerts for storage volumes using machine learning technique can provide one or more of the following advantages: detecting malware in real time, protecting storage systems in real time, reducing damage caused by malware by real time detection, reducing and/or eliminating false alarms, and providing a trained machine learning system to protect other storage volumes, storage systems, computing systems, etc.

In contrast to conventional technologies, in at least some implementations in accordance with the current technique as described herein, a method issues alerts for storage volumes using machine learning. A machine learning system analyzes Input/Output (I/O) data of a storage volume in a data storage system. The machine learning system is trained with sample I/O data patterns associated with the storage volume. Based on the I/O data, the machine learning system identifies atypical behavior associated with I/O data patterns of the I/O data, and an alert is issued.

In an example embodiment of the current technique, the method trains the machine learning system by analyzing the sample I/O data patterns over a period of time, and maintains a plurality of counters associated with the sample I/O data patterns.

In an example embodiment of the current technique, the method determines a respective threshold for each of the plurality of counters associated with the sample I/O data patterns, where the respective threshold indicates the atypical behavior.

In an example embodiment of the current technique, the plurality of counters comprises a plurality of read counters, and a plurality of write counters associated with the sample I/O data patterns.

In an example embodiment of the current technique, a respective plurality of counters is maintained for each period of time.

In an example embodiment of the current technique, the method maintains the plurality of counters for an address range within the storage volume.

In an example embodiment of the current technique, the method updates the machine learning system with the I/O data patterns identified by the analysis of the I/O data of the storage volume.

In an example embodiment of the current technique, the method determines that the I/O data patterns that triggered the alert do not indicate atypical behavior, and updates the machine learning system with the I/O data patterns that triggered the alert.

In an example embodiment of the current technique, the method maintains at least one of read counters and write counters associated with the I/O data of the storage volume. The method compares at least one of read counters and write counters associated with the I/O data of the storage volume with a plurality of read counters and a plurality of write counters associated with the sample I/O data patterns.

In an example embodiment of the current technique, the method identifies that at least one of read counters and write counters associated with the I/O data of the storage volume exceeds a threshold associated with the plurality of read counters and the plurality of write counters associated with the sample I/O data patterns, where exceeding the threshold indicates the atypical behavior associated with the I/O data patterns of the I/O data.

In an example embodiment of the current technique, the method detects a change in the I/O patterns associated with the I/O data, and compares the change in the I/O data patterns with the sample I/O data patterns associated with the storage volume.

In an example embodiment of the current technique, the method detects a change in the I/O data patterns of the I/O data, and determines that the change in the I/O data patterns indicates that the atypical behavior is indicative of a security risk.

In an example embodiment of the current technique, I/O data associated with a second storage volume is analyzed using the machine learning system that analyzed the storage volume.

In an example embodiment of the current technique, the method updates the machine learning system with the I/O data patterns identified by the analysis of the I/O data of the second storage volume.

In an example embodiment of the current technique, the machine learning system is a convolutional neural network.

In an example embodiment of the current technique, the machine learning system identifies the atypical behavior by identifying a change in compression ratio associated with the I/O data.

In an example embodiment of the current technique, the machine learning system identifies that the I/O data cannot be deduplicated.

In an example embodiment of the current technique, the method obtains at least one snapshot of the volume.

Referring now to FIG. 1, shown is an example of an embodiment of an information processing system 100 configured in accordance with an illustrative embodiment. The term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store storage volumes 110-1, 110-2, . . . 110-M. The storage volumes 110 illustratively comprise respective logical units (LUNs) or other types of logical storage volumes. The storage volume illustratively comprises at least one logical storage volume comprising at least a portion of a physical storage space of one or more of the storage devices. The term "storage volume" as used herein is therefore intended to be broadly construed, so as to encompass a set of one or more logical storage volumes.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes a machine learning system 112, an access alerts module 114, and a graphical user interface 116. The machine learning system 112 is configured to operate in conjunction with the access alerts module 114 and the graphical user interface 116. The access alerts module 114 issues an access alert when the machine learning system 112 has detected I/O data patterns on one (or more) of the storage volumes 110-M that are indicative of a security risk (i.e., a malicious "access"). In an example embodiment, the I/O data patterns are tracked using a format as explained in FIG. 2. The access alert may be sent from the access alerts module 114 to the graphical user interface 116.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for issuing access alerts may be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

FIG. 2 illustrates is an example illustration of counters used to identify data patterns, according to one embodiment. In an example embodiment, during a training phase, the machine learning system 112 is trained using a learning information table 200, which may be, for example, a 24×7 table, where each entry in the table represents an hour of the week, and where each entry comprises, for example, statistics such as total read I/O, maximum read I/O, minimum read I/O, average read I/O, total write I/O, maximum write I/O, minimum write I/O, and average write I/O. In an example embodiment, during training of the machine learning system 112, the learning information table 200 is initialized to zero, and over a period of time, the entries in the learning information table 200 are updated with each I/O. In an example embodiment, the period of time may be several weeks. In an example embodiment, a set of counters is maintained for each storage volume. In another example embodiment, a set of counters is maintained for at least one address range within a storage volume. Additionally, a set of counters may be maintained for various periods of time, for example, hours, groups of hours, daily, groups of days, weekly, groups of weeks, monthly, groups of months, etc., for a storage volume, a set of storage volumes, an address range within a storage volume, a set of address ranges within a storage volume or storage volumes, etc.

In an example embodiment, once the machine learning system 112 is trained, the monitoring phase begins where the machine learning system 112 monitors one or more storage volumes 110-M. In an example embodiment, the method maintains separate tables for the training phase (i.e., the learning information table 200), and for the monitoring phase (i.e., a monitoring information table, not shown). The separate tables may collect similar or different I/O data over various periods of time. In an example embodiment, at the beginning of each hour, for each monitored storage volume 110-M, the method resets at least one of the counters in the monitoring information table, and begins to accumulate statistics based on host device 102-N I/O data. At the end of each hour, the method updates the monitoring information table (i.e., updates the counters) with the results.

In an example embodiment, when the method updates the counters, if at least one of the counters exceeds a threshold, the access alerts module 114 issues an alert. In an example embodiment, the threshold may be defined by I/O data patterns observed while the machine learning system 112 is trained. In other words, if the counters, for example, significantly exceed the I/O data patterns observed during the training phase of the machine learning system 112, the access alerts module 114 issues an alert.

In an example embodiment, either the machine learning system 112 or the access alerts module 114 may provide the graphical user interface 116 with data accumulated in the learning information table 200, or the monitoring information table, for presentation to a user. For example, the graphical user interface 116 may be used to display trends in I/O data patterns, "hot" periods of time, "hot" storage volumes 110-M, etc.

Figure 3:
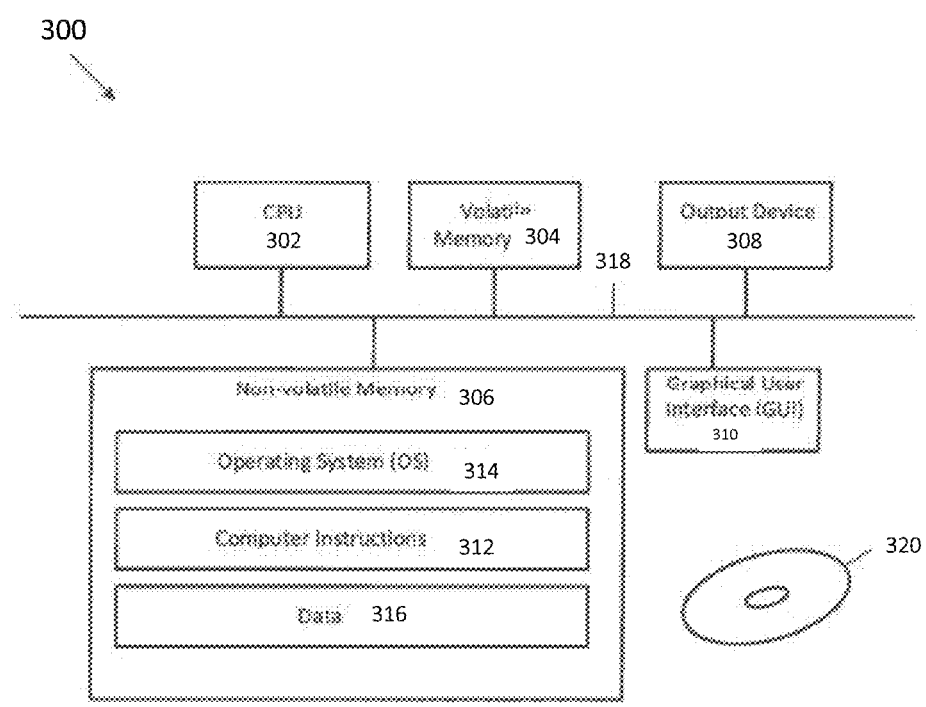
FIG. 3 is a block diagram of a computer, in accordance with an embodiment of the present disclosure.

FIG. 3 illustrates a block diagram of a computer 300 that can perform at least part of the processing described herein, according to one embodiment. The computer 300 may include a processor 302, a volatile memory 304, a non-volatile memory 306 (e.g., hard disk), an output device 308 and a graphical user interface (GUI) 116/310 (e.g., a mouse, a keyboard, a display, for example), each of which is coupled together by a bus 318. The non-volatile memory 306 may be configured to store computer instructions 312, an operating system 314, and data 316. In one example, the computer instructions 312 are executed by the processor 302 out of volatile memory 304. In one embodiment, an article 320 comprises non-transitory computer-readable instructions. In some embodiments, the computer 300 corresponds to a virtual machine (VM). In other embodiments, the computer 300 corresponds to a physical computer.

Figure 4:
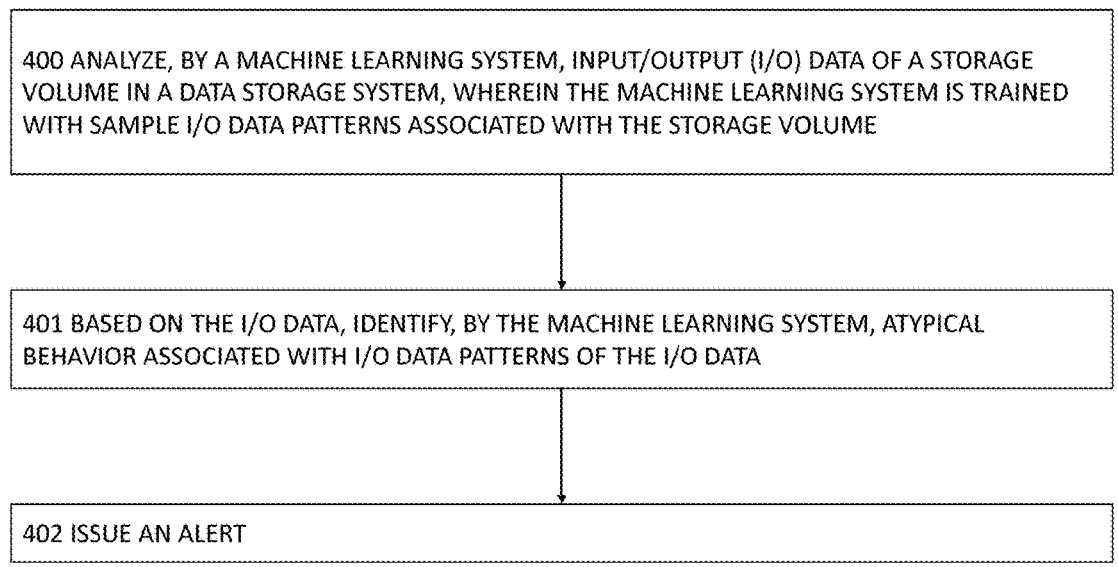
FIG. 4 is a flow diagram illustrating processes that may be used in connection with techniques disclosed herein.

Referring to FIG. 4, shown is a more detailed flow diagram illustrating issuing alerts for storage volumes using machine learning. With reference also to FIGS. 1-3, the machine learning system 112 analyzes Input/Output (I/O) data of a storage volume in a data storage system, where the machine learning system 112 is trained with sample I/O data patterns associated with the storage volume (Step 400). In an example embodiment, as described in FIG. 2, the machine learning system 112 is trained by analyzing the sample I/O data patterns over a period of time, and/or periods of time. The method maintains a plurality of counters associated with the sample I/O data patterns. In one example embodiment, the method maintains a plurality of counters for each storage volume 110-M. In another example embodiment, the method maintains a plurality of counters for at least one address range within a storage volume 110-M. As shown in FIG. 2, the method may maintain a plurality of read counters and a plurality of write counters associated with the sample I/O data patterns in, for example, the monitoring information table (not shown). The method may maintain, but is not limited to, counters to track total I/O, maximum I/O, minimum I/O, and average I/O for each of the set of read counters and write counters. In an example embodiment, a respective plurality of counters is maintained for each period of time, for example, hour, day, week, month, etc. In an example embodiment, the method determines a respective threshold for each of the plurality of counters associated with the sample I/O data patterns, where the respective threshold may indicate atypical behavior. In an example embodiment, the method determines the respective threshold based on the I/O data patterns identified by the machine learning system 112. The atypical behavior may be indicative of a security risk. In an example embodiment, when the counters associated with a storage volume 110-M being analyzed exceed the respective threshold, the method issues an access alert.

In an example embodiment, when the method machine learning system 112 analyzes Input/Output (I/O) data of a storage volume in a data storage system, the method maintains at least one of read counters and write counters associated with the I/O data of the storage volume. For example, the method may maintain read counters and write counters in the monitoring information table in a format as is depicted in FIG. 2. In an example embodiment, the method compares at least one of read counters and write counters associated with the I/O data of the storage volume with a plurality of read counters and a plurality of write counters associated with the sample I/O data patterns as maintained within the learning information table 200.

In an example embodiment, based on the I/O data, the machine learning system identifies atypical behavior associated with I/O data patterns of the I/O data (Step 401). In an example embodiment, the machine learning system 112 identifies that at least one of the read counters and write counters associated with the I/O data of the storage volume exceeds a threshold associated with the plurality of read counters and the plurality of write counters associated with the sample I/O data patterns, where exceeding the threshold indicates atypical behavior associated with the I/O data patterns of the I/O data. For example, the machine learning system 112 detects a change in the I/O patterns associated with the I/O data, and compares the change in the I/O data patterns with the sample I/O data patterns associated with the storage volume 110-M. In an example embodiment, the machine learning system 112 identifies atypical behavior associated with the I/O data patterns of the I/O data by detecting a change in the I/O data patterns of the I/O data, and determining that the change in the I/O data patterns indicates that the atypical behavior is indicative of a security risk. In an example embodiment, the machine learning system identifies the atypical behavior by identifying a change in compression ratio associated with the I/O data. For example, a change in the compression ratio may be an indication of a ransomware attack. A ransomware attack may encrypt data as part of the attack strategy, and encrypted data may not be compressible. Thus, when the machine learning system 112 identifies a change in the compression ratio associated with the I/O data, the machine learning system 112 identifies this as the atypical behavior. In another example embodiment, the machine learning system 112 may identify the atypical behavior by identifying that the I/O data cannot be deduplicated. As noted above, a ransomware attack may encrypt data, and encrypted data may not be deduplicated In an example embodiment, when the machine learning system 112 identifies the atypical behavior, the method takes a snapshot of the volume, allowing the process that is performing the data I/O writes to the volume to continue. Thus, if a user determines that a malware attack has been detected, the user has the option to recover at least some, if not most, of the data through the snapshots.

In another example embodiment, the method periodically obtains snapshots of the volume. If the method issues an alert, then the snapshots may be retained. If it is determined that the alert is a false alarm, then the method may delete the snapshots. If it is determined that the alert is not a false alarm, then the user may roll back the data on the volume to the retained snapshots.

In an example embodiment, the method updates the machine learning system with the I/O data patterns identified by the analysis of the I/O data of the storage volume 110-M. In other words, the method continues to train and re-train the machine learning system 112 as the storage volume 110-M is analyzed. In one example embodiment, the method determines that the I/O data patterns that triggered the alert do not indicate atypical behavior, and updates the machine learning system with the I/O data patterns that triggered the alert. For example, a program reading an entire storage volume 110-M from beginning to end, and looking for sensitive information will create a unique I/O signature. This exact behavior, however, may also be expected from an authorized user, for example, a weekly backup process may run this exact I/O pattern. In other words, when a false positive is identified, the method updates the machine learning system 112, to continue to train the machine learning system 112.

In an example embodiment, I/O data associated with a second storage volume, for example, 110-2, is analyzed using the machine learning system that analyzed a first storage volume, for example, 110-1. In other words, the machine learning system 112 that has been trained on the first storage volume 110-1 is used to analyze the second storage volume 110-2 to, for example, reduce and/or eliminate the time/effort needed to train the machine learning system 112 on the second storage volume 110-2. The method then updates the machine learning system 112 with the second storage volume 110-2 I/O data patterns identified by the analysis of the I/O data of the second storage volume 110-2. In other words, the machine learning system 112, trained on the first storage volume 110-1 is used to analyze the second storage volume 110-2, and during that analysis, the method continues to update (i.e., continues to train and re-train) the machine learning system 112 with the I/O data patterns from the second storage volume 110-2. Thus, a trained machine learning system 112 may continue to be trained to identify potential malware attacks and/or actual malware attacks by analyzing multiple storage volumes 110-M.

In an example embodiment, when the machine learning system 112 identifies atypical behavior associated with I/O data patterns of the I/O data, the access alerts module 114 issues an alert (Step 402). The alert, indicative of at least a potential access attack on the storage system may comprise an alert of a potential attack, an alert of an actual attack, or both such alerts separated in time from one another. In an example embodiment, the storage controller is illustratively configured to generate a message containing the generated alert of at least a potential access attack, and to deliver the message over a network to a storage administrator device. The storage controller in some embodiments is configured to generate an alert of a potential access attack and to initiate one or more access attack remediation operations responsive to confirmation of the potential attack as an actual attack. The term "alert" as used herein is intended to be broadly construed so as to encompass, for example, an alert of a potential attack, an alert of an actual attack, or a series of multiple separate alerts including a first alert of a potential attack followed by a second alert that the potential attack is an actual attack. In an example embodiment, the access alerts module 114 may transmit an alert to the graphical user interface 116 to notify a user that an alert has been generated.

In an example embodiment, the machine learning system is a convolutional neural network (CNN). In an example embodiment, the CNN learns the I/O data patterns of the sample I/O data and classifies the I/O data patterns. The input to the CNN is the data in the learning information table 200, and the output is a plurality of feature vectors that map the I/O data patterns that the CNN has detected in the I/O data from the storage volume. In an example embodiment, there is a feature vector for each I/O data pattern detected.

There are several advantages to embodiments disclosed herein. For example, the method detects malware and protects storage systems in real time, using I/O data patterns to identify malware attacks on storage systems. The method reduces false alarms through the use of machine learning systems.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of issuing alerts for storage volumes using machine learning, the method comprising:

analyzing, by a machine learning system, Input/Output (I/O) data of a storage volume in a data storage system, wherein the machine learning system is trained with sample I/O data patterns associated with the storage volume;

based on the I/O data, identifying, by the machine learning system, atypical behavior associated with I/O data patterns of the I/O data, wherein the identifying comprises identifying that the I/O data cannot be deduplicated; and issuing an alert.

2. The method of claim 1, further comprising:
training the machine learning system by analyzing the sample I/O data patterns over a period of time; and
maintaining a plurality of counters associated with the sample I/O data patterns.

3. The method of claim 2, further comprising:
determining a respective threshold for each of the plurality of counters associated with the sample I/O data patterns, wherein the respective threshold indicates the atypical behavior.

4. The method of claim 2, wherein the plurality of counters comprises a plurality of read counters and a plurality of write counters associated with the sample I/O data patterns.

5. The method of claim 2, wherein a respective plurality of counters is maintained for each period of time.

6. The method of claim 2, wherein maintaining the plurality of counters associated with the sample I/O data patterns comprises:
maintaining the plurality of counters for an address range within the storage volume.

7. The method of claim 1, further comprising:
updating the machine learning system with the I/O data patterns identified by the analysis of the I/O data of the storage volume.

8. The method of claim 1, further comprising:
determining that the I/O data patterns that triggered the alert do not indicate atypical behavior; and
updating the machine learning system with the I/O data patterns that triggered the alert.

9. The method of claim 1, wherein analyzing, by the machine learning system, I/O data of the storage volume in the data storage system comprises:
maintaining at least one of read counters and write counters associated with the I/O data of the storage volume; and
comparing the at least one of read counters and write counters associated with the I/O data of the storage volume with a plurality of read counters and a plurality of write counters associated with the sample I/O data patterns.

10. The method of claim 9, further comprising:
identifying that the at least one of read counters and write counters associated with the I/O data of the storage volume exceeds a threshold associated with the plurality of read counters and the plurality of write counters associated with the sample I/O data patterns, wherein the exceeding the threshold indicates the atypical behavior associated with the I/O data patterns of the I/O data.

11. The method of claim 1, where analyzing, by the machine learning system, I/O data of the storage volume in the data storage system comprises:
detecting a change in the I/O patterns associated with the I/O data; and
comparing the change in the I/O data patterns with the sample I/O data patterns associated with the storage volume.

12. The method of claim 1, wherein identifying, by the machine learning system, atypical behavior associated with the I/O data patterns of the I/O data comprises:
detecting a change in the I/O data patterns of the I/O data; and
determining that the change in the I/O data patterns indicates that the atypical behavior is indicative of a security risk.

13. The method of claim 1, wherein I/O data associated with a second storage volume is analyzed using the machine learning system that analyzed the storage volume.

14. The method of claim 13, further comprising:
updating the machine learning system with I/O data patterns identified by the analysis of the I/O data of the second storage volume.

15. The method of claim 1, wherein the machine learning system is a convolutional neural network.

16. The method of claim 1, further comprising:
obtaining at least one snapshot of the volume.

17. The method of claim 1, further comprising:
providing, by the machines learning system, accumulated data to a graphical user interface for presentation to a user.

18. The method of claim 17 further comprising:
rendering I/O data pattern trends on the graphical user interface using the accumulated data.

19. A system for use in issuing alerts for storage volumes using machine learning, the system comprising a processor configured to:
analyze, by a machine learning system, Input/Output (I/O) data of a storage volume in a data storage system, wherein the machine learning system is trained with sample I/O data patterns associated with the storage volume;
based on the I/O data, identify, by the machine learning system, atypical behavior associated with I/O data patterns of the I/O data, wherein the identifying comprises identifying that the I/O data cannot be deduplicated; and
issue an alert.

20. A non-transitory computer readable storage medium having computer executable program code embodied therewith, the program code executable by a computer processor to:
analyze, by a machine learning system, Input/Output (I/O) data of a storage volume in a data storage system, wherein the machine learning system is trained with sample I/O data patterns associated with the storage volume;
based on the I/O data, identify, by the machine learning system, atypical behavior associated with I/O data patterns of the I/O data, wherein the identifying comprises identifying that the I/O data cannot be deduplicated; and
issue an alert.

* * * * *